United States Patent
Bailey et al.

(10) Patent No.: US 8,521,890 B2
(45) Date of Patent: Aug. 27, 2013

(54) VIRTUAL NETWORK CONFIGURATION AND MANAGEMENT

(75) Inventors: Kimberly T. Bailey, Raleigh, NC (US); Patricia G. Driever, Poughkeepsie, NY (US); Constantinos Kassimis, Cary, NC (US); Angelo Macchiano, Sr., Apalachin, NY (US); Gary O. McAfee, Raleigh, NC (US); Jerry W. Stevens, Raleigh, NC (US); Richard P. Tarcza, Kingston, NY (US); Alexandra Winter, Schwieberdingen (GE)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/155,373

(22) Filed: Jun. 7, 2011

(65) Prior Publication Data

US 2012/0317567 A1    Dec. 13, 2012

(51) Int. Cl.
*G06F 15/16* (2006.01)
(52) U.S. Cl.
USPC .......................... 709/228; 709/227
(58) Field of Classification Search
USPC ................................... 709/227, 228
See application file for complete search history.

(56) References Cited

U.S. PATENT DOCUMENTS

| | | | |
|---|---|---|---|
| 6,314,525 B1 | 11/2001 | Mahalingham et al. | |
| 6,687,758 B2 | 2/2004 | Craft et al. | |
| 6,854,021 B1 * | 2/2005 | Schmidt et al. | 710/5 |
| 7,809,847 B2 | 10/2010 | Boucher et al. | |
| 7,921,177 B2 | 4/2011 | Raisch et al. | |
| 2006/0029097 A1 | 2/2006 | McGee et al. | |
| 2010/0138567 A1 | 6/2010 | Haggar et al. | |
| 2011/0072427 A1 | 3/2011 | Garmark | |
| 2011/0078680 A1 | 3/2011 | Lagergren et al. | |
| 2012/0110086 A1 * | 5/2012 | Baitinger et al. | 709/205 |
| 2012/0110154 A1 * | 5/2012 | Adlung et al. | 709/223 |
| 2012/0110155 A1 * | 5/2012 | Adlung et al. | 709/223 |
| 2012/0110164 A1 * | 5/2012 | Frey et al. | 709/224 |
| 2012/0110588 A1 * | 5/2012 | Bieswanger et al. | 718/104 |
| 2012/0215921 A1 * | 8/2012 | Adlung et al. | 709/226 |
| 2013/0080643 A1 * | 3/2013 | Baitinger et al. | 709/226 |
| 2013/0081047 A1 * | 3/2013 | Frey et al. | 718/104 |

OTHER PUBLICATIONS

Cisco Systems, Inc.; How Link Aggregation Works; Document ID 108906; Dec. 12, 2008.

* cited by examiner

*Primary Examiner* — Kenny Lin
(74) *Attorney, Agent, or Firm* — David Mims; Robert C. Rolnik

(57) ABSTRACT

A Hardware Management Console (HMC) configures virtual networks. The HMC extends Internal Queued Direct I/O to an intra-ensemble data network (IEDN) within a cluster of virtual servers to define a single channel path identifier, and to define a channel parameter. The HMC defines at least one virtual network. The HMC defines a bridge port within each CPC that supports at least one of the virtual servers. The HMC defines a network interface for each virtual server within each cluster. The HMC grants access to a corresponding virtual network for each virtual server.

17 Claims, 6 Drawing Sheets

| VIRTUAL SERVER | IP ADDRESS |
|---|---|
| 321 { A.1 | 10.0.1.1 |
| 322 { A.2 | 10.0.1.2 |
| 323 { A.3 | 10.0.1.11 |
| 324 { B.1 | 10.0.2.1 |
| 325 { B.2 | 10.0.2.2 |
| 326 { C.1 | 10.0.3.1 |
| 327 { C.2 | 10.0.3.2 |
| 328 { D.1 | 10.0.4.1 |
| 329 { D.2 | 10.0.4.2 |
| ••• | ••• |

320

VIRTUAL NETWORK CONFIGURATION AND MANAGEMENT

CROSS REFERENCE TO RELATED APPLICATIONS

This application is related to commonly assigned and co-pending U.S. patent application Ser. No. 13/155,153 entitled "TRANSPARENT HETEROGENOUS LINK PAIRING", filed on even date herewith and hereby incorporated by reference.

BACKGROUND OF THE INVENTION

1. Field of the Invention

The present invention relates generally to a computer implemented method, data processing system, and computer program product for networking. More specifically, the present invention relates to provisioning and/or configuring virtual machines on corresponding virtual networks.

2. Description of the Related Art

Modern customers of data centers need to respond to a business climate that permits a new service provider (or customer) to be a disruptor in one year, and then become disrupted in a following year. Consequently, as a customer seeks scalable data processing resources, that customer may require computing power that spans more than one data processing center.

In a grid or cloud computing environment, a number of virtual servers can be assigned to the customer's task by a data center operator. Since the virtual servers can be geographically dispersed, and rely on the Internet to exchange work units among them, the topology of the network that establishes system integrity can be complex. In prior art solutions, a data center operator would dedicate plural HMCs (Hardware Management Console) to the operation of configuring each set of virtual servers within each data center. In addition to having distinct internal and external virtual and physical LAN segments assigned to the customer's virtual servers in each data center, the customer contends with multiple administrative domains. As a consequence, set-up, day to day administrative management and expansion to plural LAN segments can be time consuming and delay deploying extra capacity into service for the customer. Moreover, traditionally, the operation of a single data center often is assigned an administrator on a one-to-one basis. Accordingly, multiple data centers have been managed by multiple administrators, and the job of tying all those functions together has been assigned to another administrator.

Accordingly, improvements and remedies are needed.

SUMMARY OF THE INVENTION

The present invention provides a computer implemented method, data processing system, and computer program product for configuring virtual networks through the use of a hardware management console (HMC). The HMC extends the internal networks of a plurality of the central processing complex (CPC) provided by Internal Queued Direct I/O to the external networks of the intra-ensemble data network (IEDN) within a cluster of virtual servers referred to as the ensemble. The Internal Queued Direct I/O networks within each CPC are extended to the IEDN by defining a single channel path identifier with a channel parameter. The HMC defines a plurality of virtual networks. The HMC defines a virtual switch with a bridge port within each CPC. The HMC defines a network interface for each virtual server within each cluster. The HMC defines and controls access to a corresponding virtual network for each virtual server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A-3D are data structures for channel path identifiers (CHPID) configuration, virtual server configuration, virtual network configuration and bridge port configuration, respectively, in accordance with an illustrative embodiment of the invention;

FIG. 4 is a block diagram of a virtual switch or vswitch configuration as well as virtualization within the central processing complex (CPC), in accordance with an illustrative embodiment of the invention;

DETAILED DESCRIPTION OF THE PREFERRED EMBODIMENT

Figure 1:
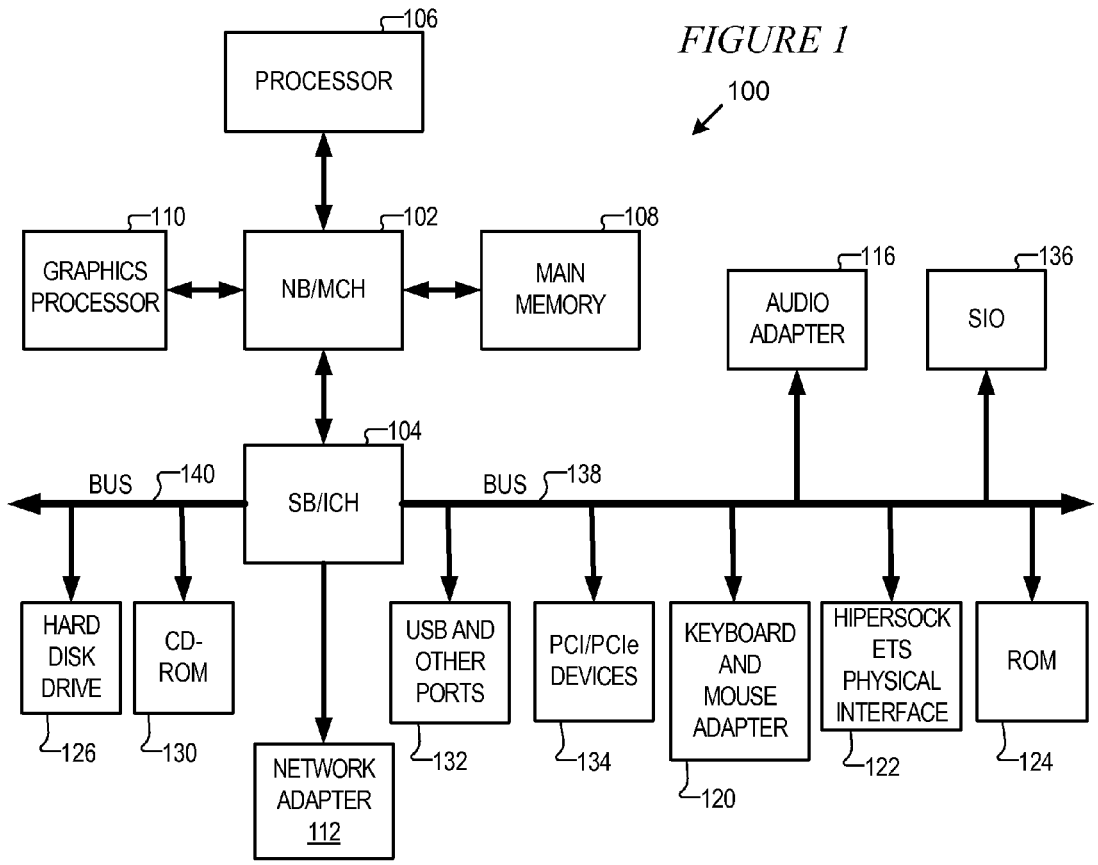
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, network adapter 112 connects to south bridge and I/O controller hub 104 and audio adapter 116, keyboard and mouse adapter 120, HiperSockets™ physical interface 122, read only memory (ROM) 124, hard disk drive (HDD) 126, CD-ROM drive 130, universal serial bus (USB) and other ports 132, and PCI/PCIe devices 134 connect to south bridge and I/O controller hub 104 through bus 138 and bus 140. HiperSockets is a trademark of International Business Machines Corporation. HiperSockets is referred to equivalently herein as internal queued direct input/output (IQDIO). PCI/PCIe devices may include, for example, Ethernet adapters, add-in cards, and PC cards for notebook computers. PCI uses a card bus controller, while PCIe does not. ROM 124 may be, for example, a flash binary input/ output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104 through, for example, bus 138.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Oracle America, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as HiperSockets physical interface 122 or network adapter 112. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The operation of the communication unit can form a terminal point of a channel. A channel provides a path between I/O devices and memory, or between I/O devices. Channels can be identified with channel path identifiers (CHPIDs). The physical location of a channel is described using its physical channel identifier (PCHID). Data processing system 100 may be entirely on a single card which can be placed into a frame that houses many data processing systems, such as, for example, a central processor complex (CPC) of a z9™ mainframe. It is appreciated that some functions, such as that of storage, may be located elsewhere in the frame or even elsewhere in a data center.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device. The term "computer-readable storage device" does not encompass a signal propagation media such as a copper cable, optical fiber or wireless transmission media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit users to benefit from the use of two physical interfaces that operate at different speeds to route packets between servers of a central processing complex (CPC) as well as among servers beyond the CPC that rely on two networks that are coupled to the physical interface. Although a virtual server may have two physical interfaces, each server functions as if only a single interface were used and therefore is assigned a single IP address, which can be an IPv4, IPv6, or a combination of IPv4 and IPv6 addresses. The illustrative embodiments can permit an administrator to simplify network configuration despite data center nodes being separated geographically, but still benefit from high speed communication for virtual servers communicating within a central processor complex (CPC). Once processing is complete, for example, per FIG. 5, below, virtual servers that are present on plural physical segments of a network, actually have logical connections using a common data link layer 2 local area network segment. Furthermore, the operation of FIG. 5, as will be explained, in contrast with that of the prior art, can be administered from a single administrative node.

A data link layer two (2) local area network segment is a logical network segment that may rely on multiple physical segments to behave as a single virtual network segment according to the open systems interconnection (OSI) model of layer two. Accordingly, a device sending on a first physical segment may transparently communicate to a device physically connected to a second physical segment.

Figure 2:
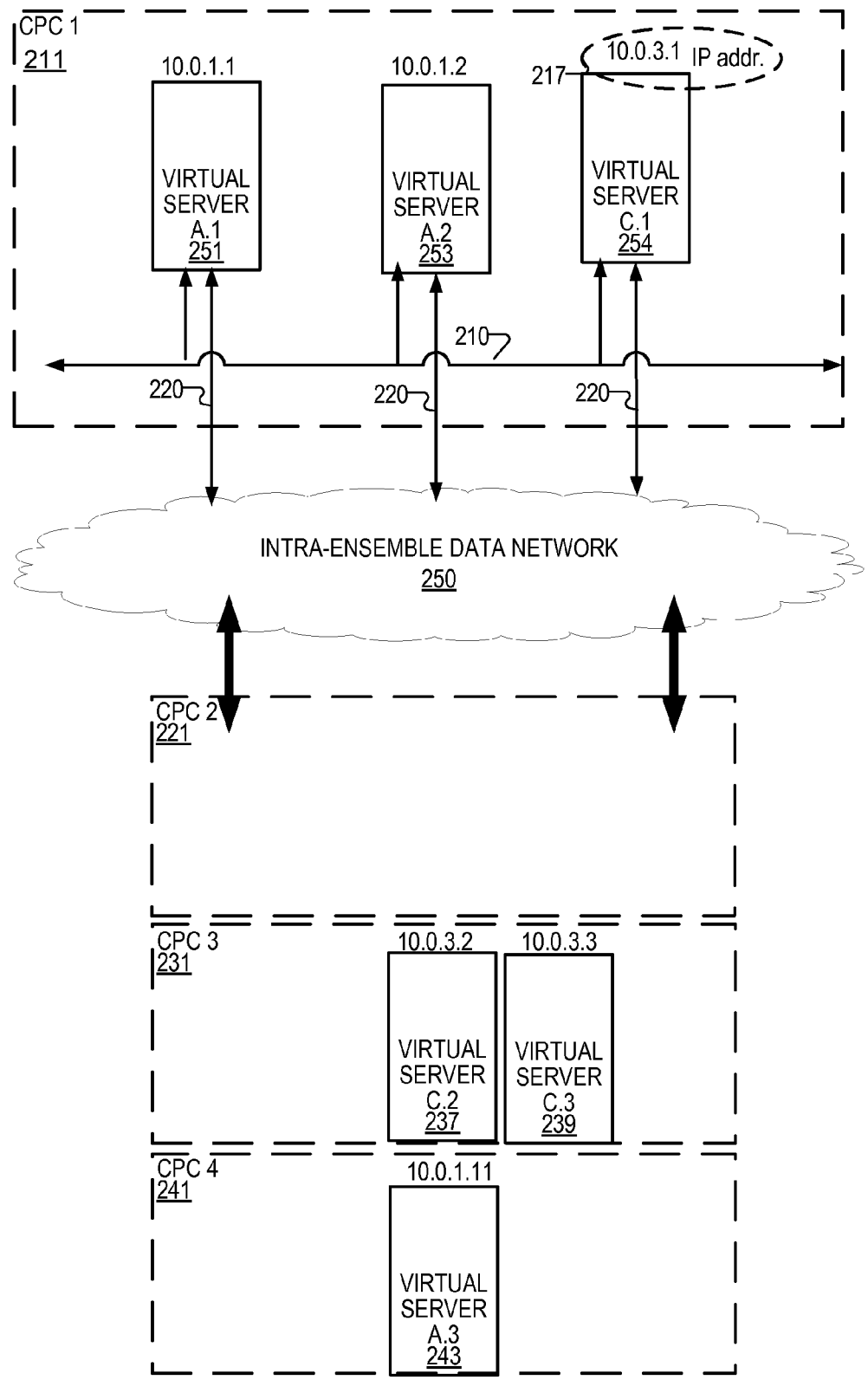
FIG. 2 is a central processor complex in accordance with an illustrative embodiment of the invention.

FIG. 2 is a central processor complex in accordance with an illustrative embodiment of the invention. A central processor complex (CPC) is a frame of mechanical supports and electrical connectors that provide rigid paths along which components of the data processing system may communicate. For example, central processing complex 1 (CPC) 211 is a frame of shelves, backplanes, power mains and the like that, when populated with memory, non-volatile storage, processors, etc., supports one or more logical partitions or virtual servers. In this example, three virtual servers are shown as virtual server (VS) A.1 251, VS A.2 253 and VS C.1 254. Each server can be according to data processing system 100 of FIG. 1. Each server may interconnect using the intra-ensemble data network (IEDN) 250 over the Ethernet network 220, using, for example, Ethernet adapters. In addition, servers which are on the same CPC may interconnect using the HiperSockets network 210 (which is a subset of the IEDN) over HiperSockets interfaces.

A server is distinguishable from a virtual server in that the server is the collection of cooperating physical parts that make up a data processing system. A virtual server, on the other hand, is a server that is defined logically and is apportioned resources of one or more data processing systems in a manner that permits the resources of a server to be shared to plural virtual servers, and yet maintains isolation between the virtual servers. Accordingly, failures of logical operation in a virtual server may occur without affecting other virtual servers that share a resource of the underlying server, which is physical. An example of a virtual server is a logical partition. A virtual server is sometimes known as a guest virtual machine loaded with an operating system image. A logical partition can support a single operating system image or an instance of z/VM which supports multiple virtual machines (servers). A z/VM hypervisor is (or z/VM) a system that virtualizes the real hardware environment. This function allows an individual, virtual environment to be created for anything that runs on the computer. In operation, z/VM controls all the hardware, memory and processors, giving out resources to its "guests" as they need them. A z/VM is a virtual machine hypervisor based on a z/Architecture® computer software, hardware, and firmware. The z/Architecture is a trademark of International Business Machines Corporation.

A server, such as server C.1 254, may connect to other servers using the distinct media of Ethernet network 220 or HiperSockets network 210. The server can select among the two networks, for example, selecting the HiperSockets network 210 if a target server is present in the same CPC as the source server and selecting the Ethernet network 220 when the target server is not present in the same CPC. In either case, the server may identify itself by using a single IP address (IP address 217) regardless of the physical interface to the Ethernet or HiperSockets network. A target server is the destination to which a packet is directed. A source server is an originating point for a packet. An intra-ensemble data network (IEDN) is a network of servers that connect using Ethernet physical interfaces. The intra-ensemble data network may rely only on a planar media to distribute packets amongst nodes of the IEDN. A planar medium can consist of physical conductors that are not twisted. A planar medium can include backplanes, connectors, ribbon cables and bundled cables. In contrast, the Ethernet media may rely on twisted pairs of cables or planar media within a frame of the CPC. A twisted pair medium is any cabling that has at least one pair of conductors that transpose position at least twice along the length of the cable. Thus, benefits can accrue when two HiperSockets physical interfaces are present on a common planar medium such as, for example, a backplane within a central processing complex (CPC). In such a configuration, embodiments of the invention can transparently use a higher speed HiperSockets connectivity, if it is available at both the source server and the destination server, and the servers are reliant on the common planar medium. In contrast, to the extent that a stream is to be transported from a server within a CPC to one located outside the CPC, the stream can be transported as Ethernet packets via the IEDN 250 according to an MTU setting that is smaller than if the stream relied on a HiperSockets interface.

A HiperSockets physical interface may be a bus connector that relies on device drivers on corresponding servers, as explained in U.S. Pat. No. 6,854,021 filed Oct. 2, 2000 by Schmidt et al. for COMMUNICATIONS BETWEEN PARTITIONS WITHIN A LOGICALLY PARTITIONED COMPUTER, owned by the assignee of the present invention and incorporated herein by reference. The HiperSockets physical interface is identified in the hardware I/O configuration by its channel path identifier (CHPID). A CHPID is a data structure or other serial number that identifies a logical identifier of a channel. A channel is the communication path to an I/O device. When the operating system or any application performs I/O to a device over a particular channel, it uses the channel's CHPID to address the physical channel port. A CHPID number is in the range from hex 00 to hex FF. The physical layer can include one or more cables according to the Cat-6 standard 802.3z standard, 802.3ab standard or similar standard. Packets on the IEDN are TCP/IP packets.

By way of the intra-ensemble data network 250, a virtual server of CPC 1 211, may exchange data with virtual servers beyond the CPC, for example, in CPC 3 231, namely, virtual server C.2 237 and virtual server C.3 239. Further servers are present in CPC 4 241, namely virtual server A.3 243. Physically, each CPC may be disjoint from each other. In other words, servers of CPC 221 can be connected to each other using a planar backplane, or a common Ethernet cable. However, in order to address servers beyond CPC 221, the facilities of Intra-ensemble data network 250 are required. These facilities can include a virtual switch or vswitch. A virtual switch is a virtualized representation of a hardware local area network (LAN) switch. A virtual switch is capable of bridging, for example, a z/VM guest LAN, or a HiperSockets network to an associated real LAN connected by an Open Systems Adapter-express (OSA-express) adapter. The vswitch may be configured to handle IEDN traffic. Alternatively, the vswitch may be configured to handle traffic on a customer's external network. If configured to handle IEDN traffic, the virtual switch is referred to as an intra-ensemble data network (IEDN) virtual switch. An IEDN virtual switch is a virtual switch that interconnects IEDN media, for example, planar busses and/or Ethernet cabling. IEDN media may include other media that supports TCP/IP protocols.

Each CPC may host one or more virtual servers. For example, CPC 1 211 hosts virtual server A.1 251 and virtual server A.2 253. Each virtual server can be assigned an IP address. In the examples given below, IPv4 addresses are assigned to each virtual server. However, it can be appreciated that IPv6 addresses may be assigned to each virtual server in addition to, or as an alternative to the IPv4 addresses. For example, virtual server A.1 251 can be assigned IP address 10.0.1.1, virtual server A.2 253 can be assigned IP address 10.0.1.2, and virtual server C.1 254 can be assigned IP address 10.0.3.1.

FIGS. 3A-3D are data structures for CHPID configuration, virtual server configuration, virtual network configuration and bridge port configuration, respectively, in accordance with an illustrative embodiment of the invention. A virtual network is a network consisting of both internal Queued Direct I/O and IEDN LAN segments.

FIG. 3A is the relationship between CHPID and one or more channel parameters, in accordance with an illustrative embodiment of the invention. Data of data structure 300 may be stored to non-volatile memory. Each CPC is assigned a CHPID. For example, in defining the CPC parameters, the CPC 1 in row 301 is assigned IQD CHPID xF1 and channel parameter IQDX. Similar assignments can be made for CPC 2, CPC 3 and CPC 4, in rows 303, 305 and 307, respectively.

Figures 3B, 4:
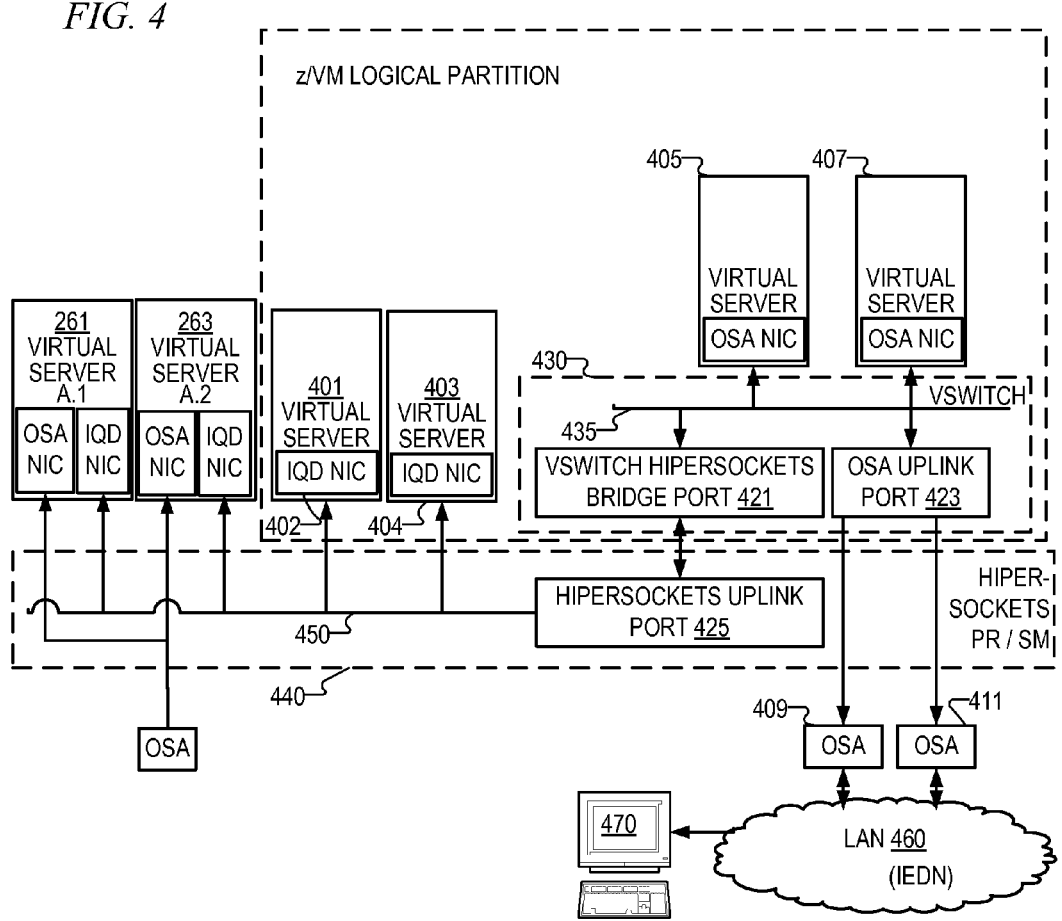

FIG. 3B is the relationship between virtual server and internet protocol (IP) addresses in accordance with an illustrative embodiment of the invention. Data of data structure 320 may be stored to non-volatile memory. As an example, virtual servers can be assigned as shown in rows 321, 322 and 323. In those rows, servers A.1, A.2 and A.3 are assigned IP addresses 10.0.1.1, 10.0.1.2 and 10.0.1.11, respectively. Similar assignments are made in rows 324-329. As may be appreciated, the assignments shown are an example. Many additional assignments may be made with data structure 320.

FIG. 3C is the relationship between virtual network name and the virtual servers assigned to that virtual network in accordance with an illustrative embodiment of the invention. Data of data structure 330 may be stored to non-volatile memory. In row 331, virtual network A can be assigned IP subnet, 10.0.1/24, and have the set of servers defined as "A.1, A.2, A.3-A.16" collectively be part of the virtual network A. Similar assignments for virtual networks B, C, and D can be made in rows 333, 335 and 337.

FIG. 3D is the relationship between each bridge port and an identifier in accordance with an illustrative embodiment of the invention. Data of data structure 340 may be stored to non-volatile memory. Each row of data structure 340 has a corresponding a bridge port and an uplink port to a virtual switch or vswitch. The bridge and uplink ports are configured by the user using the HMC. The QDIO architecture provides a means to identify the bridge and uplink connections as special connections or privileged connections. For example, vswitch A is assigned a bridge port identified with the identifier, "device A1", and uplink port identified with the identifier "device A2" in row 341. Vswitch A may be a virtual switch used in virtual network A. Similar assignments for virtual switches B, C, and D can be made in rows 343, 345 and 347.

FIG. 4 is a block diagram of a virtual switch or vswitch configuration as well as virtualization within the CPC, in accordance with an illustrative embodiment of the invention. While FIG. 2 showed a logical view of the interaction of virtual servers, FIG. 4 shows the physical arrangement of how one set of virtual servers in a CPC may connect to a local area network (LAN). A virtual switch can include multiple guest ports connecting operating systems that run in one or more virtual machines. A virtual switch, such as vswitch 430, may be a z/VM virtual switch. A z/VM virtual switch is a virtual switch that relies on resources managed by a z/VM hypervisor. In other words, the virtual switch can be part of the z/VM hypervisor. The guest ports connect through simulated network interface cards (NICs). The guest ports support virtual servers, for example, virtual servers 401, 403, 405 and 407. In addition to the guest ports, (simulated virtual switch NIC guest ports) a vswitch can also have one or more uplink ports, for example, Open Systems Adapter (OSA) uplink port 423. These uplink ports are physical ports used by the virtual switch to merge its simulated LAN 435 into an external LAN, for example, LAN 460. Both guest and uplink ports provide the infrastructure necessary to allow Ethernet connectivity between simulated guest ports to a physical port on an external LAN, such as, for example, OSA 409 and OSA 411.

Outside the z/VM, virtual servers A.1 261 and A.2 263 connect via their respective OSA NICs to an external OSA interface. Furthermore, each virtual server, A.1 and A.2, may rely on IQD NICs to interconnect to the HiperSockets LAN 450. Virtual servers A.1 261 and A.2 263 may be the same virtual server as virtual servers A.1 261 and A.2. 263 in FIG. 2, respectively.

A bridge port is a hybrid port that extends the vswitch's simulated LAN segment with logical ports in an internal HiperSockets LAN, for example, HiperSockets LAN 450. FIG. 4, for example, uses bridge port 421 to connect to hipersockets uplink port 425. The bridge port extends vswitch 430 to include both simulated guest ports (vNICs) referred to equivalently as a IQD NIC and real ports (NIC). Each of the guest ports and the real ports can communicate with each other as well as with external LAN destinations through the virtual switch's uplink port or ports.

Vswitch 430 maintains a hash table, or other data structure, to record the correspondence between MAC addresses and internet protocol addresses. In response to the vswitch receiving a packet with an unmatched MAC address (not present in the hash table), the vswitch sends such packets to OSA uplink port 423 or vswitch hipersockets bridge port 421. As a result, the packets sent to the uplink port are sent to a physical port on a physical network, such as, for example IQD NIC 402 and IQD NIC 404.

The availability of physical networks in two forms, namely, HiperSockets processor-resource/system-manager (PR/SM) 440 and LAN 460 (through use of open systems adapter (OSA)), permits, through at least one embodiment of the invention, bridging of virtual network 435 with two physical networks. In the example of FIG. 4, the two physical networks are Hipersockets LAN 450, and LAN 460. LAN 460 may implement an IEDN. The operation of the bridge port is shown, in a larger scale deployment, in FIG. 6, below.

In particular, a vswitch in one CPC can be used to connect to a LAN. The LAN, in turn, can relay communications to a further vswitch in a second CPC. Accordingly, the combined operation of the vswitches in their respective CPCs, as well as the LAN, can simulate the layer 2 network in a manner to make the virtual servers in one CPC directly addressable to the virtual servers in a second CPC as if the virtual servers were on the same LAN segment. FIG. 4 blocks 401-407, 421, 423, 435 and 440 may be under the control of the z/VM logical partition.

Figure 5:
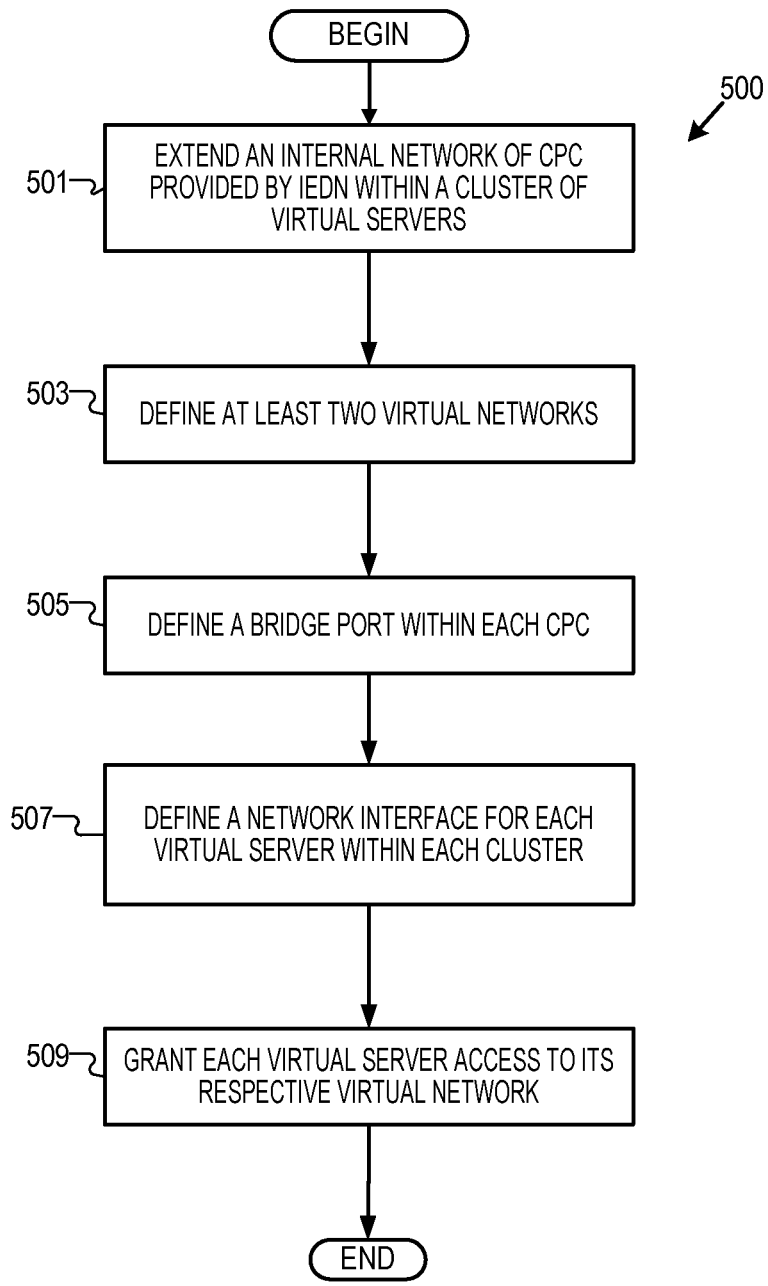
FIG. 5 is a flowchart of an administrator's actions to configure a virtual network in accordance with an illustrative embodiment of the invention.

FIG. 5 is a flowchart of an administrator's actions to configure a virtual network in accordance with an illustrative embodiment of the invention. The steps of FIG. 5, configuration procedure 500, may include activating a HiperSockets interface in the manner shown in U.S. patent application Ser. No. 13/155,153, "TRANSPARENT HETEROGENOUS LINK PAIRING", filed on even date herewith, hereby incorporated by reference. The administrator acts through, and logically may be considered a part of, the hardware maintenance console (HMC). A hardware maintenance console is a data processing system that presents correct credentials to a processor in a CPC. The HMC may display a system console as a window or other display area on a personal computer or other tool of the administrator. Accordingly, the HMC is the primary instrument by which logical connections and other administrative functions are performed with respect to one or more CPCs.

Initially, the HMC extends an internal network of a plurality of CPCs provided by the intra-ensemble data network (IEDN) within a cluster of virtual servers (step 501). As such, the IQDIO networks within each CPC are extended to the IEDN by defining a single CHPID with a channel parameter. Internal queued direct input/output (IQDIO) can be implemented as a form of open systems adapter-express (OSA-express) queued direct I/O known has HiperSockets, explained above. OSA-express is integrated hardware feature that allows the System z9™ platform, and others, to provide industry-standard connectivity directly to clients on LANs or wide area networks (WANs). System z9 is a trademark of International Business Machines Corporation.

Figure 6:
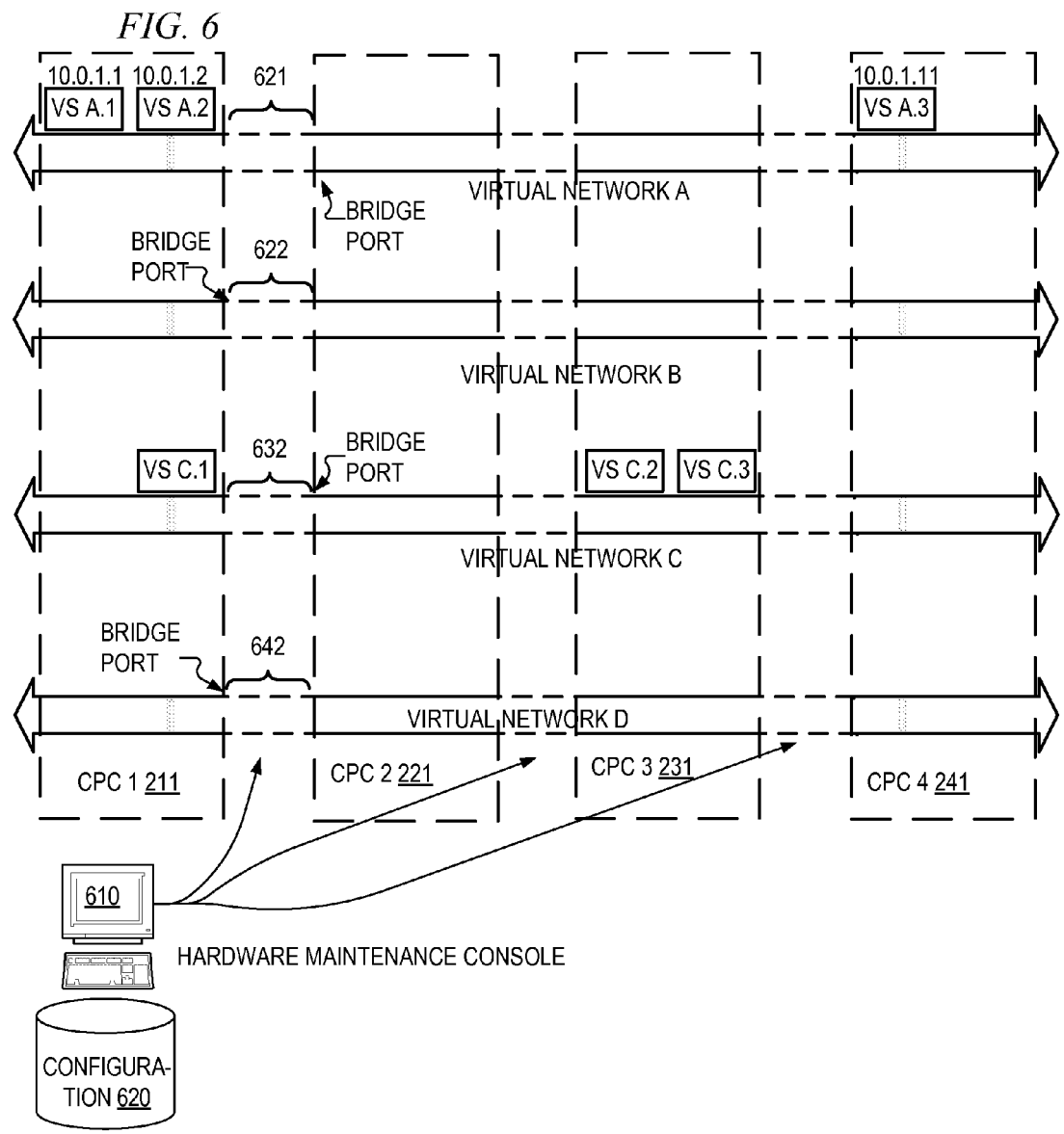
FIG. 6 is a logical configuration of at least one virtual network in accordance with an illustrative embodiment of the invention.

Next, the HMC defines at least two virtual networks (step 503). First, the HMC may define the virtual network name and virtual LAN identifier (VLAN ID) for a virtual network. Second, the HMC may associate each virtual server with each virtual network. Third, the operating system administrator may define an IP address and IP interface, with a matching VLAN ID, to each authorized virtual network. Setting up virtual networks can include activating a HiperSockets interface for each virtual server. In addition, the setup or defining of a virtual network can include defining a network interface for each virtual server for a corresponding virtual network. Setting up the network interface can include assigning no more than one internet protocol address to each virtual server in its virtual network. FIG. 6, below, illustrates some examples of internet protocol address assignment.

Next, the HMC may define a bridge port within each CPC (step 505). The bridge port can include assigning a specific bridge port to a specific uplink port. For example, in vswitch 430 (of FIG. 4) can be identified with "vswitch A", or other unique identifier. Vswitch A can be assigned specific ports, namely, DEVICE A1 as bridge port 421, and DEVICE A2 as uplink port 423. Defining the bridge port can include defining a virtual switch. Accordingly, the setup of the bridge ports can include establishing the identity of vswitch corresponding parts by linking the identifiers of vswitch, bridge port and uplink part in each row of bridge port data structure 340 in FIG. 3D.

Next, the HMC may define a network interface for each virtual server within each cluster (step 507). A cluster or ensemble is a collection of virtual servers assigned to coordinate together on a common task under the control of a customer. A cluster can be the set of virtual servers that are isolated from other clusters, but respond on a common LAN segment. FIG. 6, below, gives examples of four clusters of virtual servers, such as, cluster A, comprised at least of virtual servers A1, A2 and A3.

Next, the HMC may grant each virtual server access to its respective virtual network (step 509). Granting access includes setting permissions by the virtual server to a logical adapter based on a HiperSockets physical interface or an Ethernet adapter. For example, with respect to virtual network A, the virtual servers A1, A2, A.3 through A.16 may be granted permissions based on their logical adapters so that they each may access the facilities of the virtual switch present in their respective CPCs.

Processing may terminate thereafter.

FIG. 6 is a logical configuration of at least one virtual network in accordance with an illustrative embodiment of the invention. FIG. 6 includes the CPCs described earlier, with reference to FIG. 2—namely, CPC 1 211, CPC 2 221, and CPC 3 231 and CPC 4 241. Virtual servers A.1, A.2 and C.1 are present and using IP addresses 10.0.1.1, 10.0.1.2 and 10.0.3.1, respectively. As a result of forming bridge ports in step 405, above, a unified LAN segment is formed across all CPCs for the A cluster. For example, bridge 621 links CPC 1 211 to CPC 2 221. Two additional bridges complete the cluster such that virtual server A.3 may transparently connect to virtual servers A.1 and A.2 across the bridge ports. The bridge ports can be operated by a virtual switch. Additional bridge ports may support cluster B, cluster C and cluster D on networks B, C and D. These bridge ports are bridge port 622, bridge port 632 and bridge port 642, respectively. HMC 610 may write to, and read from, configuration storage 620. For example, HMC 610 can store data structures 300, 320, 330 and 340 of FIGS. 3A, 3B, 3C and 3D, respectively, in configuration storage 620. Accordingly, HMC 610 can perform the configuration procedure 500 of FIG. 5, to configure the overall bridge.

Figure 7:
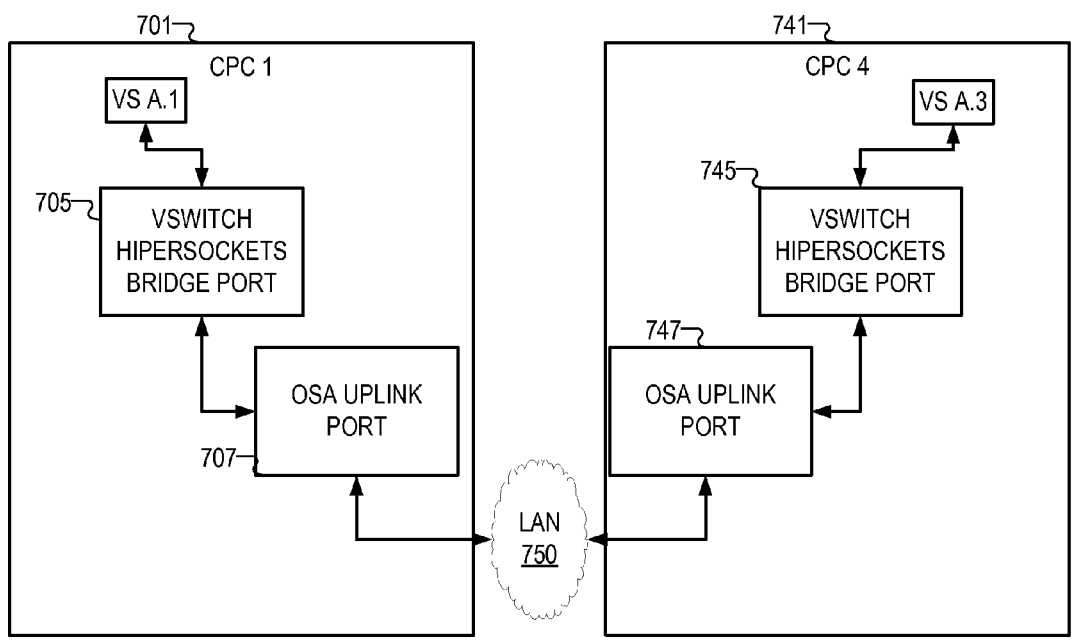
FIG. 7 is a logical arrangement of vswitches and other configured facilities to permit two virtual servers to communicate in accordance with an illustrative embodiment of the invention.

FIG. 7 is a logical arrangement of vswitches and other configured facilities to permit two virtual servers to communicate in accordance with an illustrative embodiment of the invention. CPC 1 701 and CPC 4 741 support virtual servers VS A.1 and VS A.3. CPC 1 701 may be CPC 1 211 of FIGS. 2 and 6. CPC 4 may be, for example, CPC 4 241 of FIGS. 2 and 6. These virtual servers communicate with respective vswitch HiperSockets bridge ports 705, 745. Each vswitch HiperSockets bridge port, in turn, communicates with OSA uplink ports 707 and 747. For each CPC, the vswitch HiperSockets bridge port may be arranged in the manner of the FIG. 4 illustrated vswitch HiperSockets bridge port 421. Similarly, the respective OSA uplink ports can be arranged in the manner of FIG. 4 illustrated OSA uplink port 423. OSA uplink port 707 communicates to local area network (LAN) 750. Similarly, OSA uplink port 747 communicates to LAN 750.

Creation of the bridge ports and their maintenance and expansion can be coordinated from hardware maintenance console (HMC) 510. The HMC can be, for example, zManager, a hypervisor manufactured by International Business Machines Corporation. HMC 510 can also establish the IP addresses for each virtual server. The configuration information may be stored to configuration 520. The configuration details can be distributed to the respective nodes in the CPCs. In addition, the configuration details may be backed up to a single storage medium.

By use of one or more embodiments, the administrator may control the configuration of virtual servers and virtual networks on local and remote CPCs. In addition, rather than configure multiple IP addresses per virtual server, a single IP address (using IPv4, IPv6 or a hybrid) is assigned. By the administrator focusing attention to a single logical interface per virtual server, the administrator may achieve more rapid deployment of plural virtual servers in plural CPCs as compared to prior art methods. Furthermore, the administrator, having a reduced administrative burden, can follow a streamlined flowchart through the use of an HMC, to remotely manage data centers that are geographically disperse, yet logically connected through the operation of HiperSockets LAN and conventional LANs. As such, operations, deployment and maintenance can be performed directly through a single HMC.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Firmware may be resident in tangible storage devices, such as, for example, programmable logic arrays, read-only memory, flash memory, solid-state disks, and the like.

Furthermore, the invention can take the form of a computer program product accessible from a computer-usable or computer-readable storage device providing program code for use by or in connection with a computer or any instruction execution system. For the purposes of this description, a computer-usable or computer readable medium can be any tangible apparatus that can contain or store the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for configuring virtual networks, the computer program product comprising: one or more computer-readable, tangible storage devices;
   program instructions, stored on at least one of the one or more storage devices, to extend Internal Queued Direct I/O to an intra-ensemble data network (IEDN) within a cluster of virtual servers to define a single channel path identifier, and to define a channel parameter;
   program instructions, stored on at least one of the one or more storage devices, to define at least one virtual network;
   program instructions, stored on at least one of the one or more storage devices, to define at least one bridge port within each central processing complex (CPC) that supports at least one of the virtual servers;
   program instructions, stored on at least one of the one or more storage devices, to define a network interface for each virtual server within each cluster; and
   program instructions, stored on at least one of the one or more storage devices, to define access to a corresponding virtual network for each virtual server.

2. The computer program product of claim 1, wherein program instructions, stored on at least one of the one or more storage devices, to define a bridge port further comprises program instructions, stored on at least one of the one or more storage devices, to define a virtual switch.

3. The computer program product of claim 1, wherein the virtual switch is an intra-ensemble data network virtual switch.

4. The computer program product of claim 1, further comprising:
   program instructions, stored on at least one of the one or more storage devices, to define on a virtual server basis, a network interface for the corresponding virtual network.

5. The computer program product of claim 1, wherein at least two virtual servers are in a common virtual network and in a common CPC.

6. The computer program product of claim 1, wherein program instructions, stored on at least one of the one or more storage devices, to define at least one virtual network further comprises:
   program instructions, stored on at least one of the one or more storage devices, to assign no more than one internet protocol address to each virtual server of the cluster of virtual servers in the at least one virtual network.

7. The computer program product of claim 6, wherein program instructions, stored on at least one of the one or more storage devices, to define at least one virtual network further comprises:
   program instructions, stored on at least one of the one or more storage devices, to activate a HiperSockets interface for each virtual server.

8. The computer program product of claim 6, wherein the one internal protocol address is an IPv4 and an IPv6 address.

9. The computer program product of claim 1, wherein the one or more computer-readable, tangible storage device is one selected from the group consisting of a programmable logic array, read-only memory, flash memory, and a solid-state disk.

10. A data processing system for configuring virtual networks, wherein the processing system comprises: one or more processors, one or more computer-readable memories and one or more computer-readable, tangible storage devices;
   program instructions, stored on at least one of the one or more storage devices for execution by at least one of the one or more processors via at least one of the one or more memories, to extend Internal Queued Direct I/O to an intra-ensemble data network (IEDN) within a cluster of virtual servers to define a single channel path identifier, and to define a channel parameter;
   program instructions, stored on at least one of the one or more storage devices for execution by at least one of the one or more processors via at least one of the one or more memories, to define at least one virtual network;
   program instructions, stored on at least one of the one or more storage devices for execution by at least one of the one or more processors via at least one of the one or more memories, to define at least one bridge port within each central processing complex (CPC) that supports at least one of the virtual servers;
   program instructions, stored on at least one of the one or more storage devices for execution by at least one of the one or more processors via at least one of the one or more memories, to define a network interface for each virtual server within each cluster; and
   program instructions, stored on at least one of the one or more storage devices for execution by at least one of the one or more processors via at least one of the one or more memories, to define access to a corresponding virtual network for each virtual server.

11. The data processing system of claim 10, wherein program instructions, stored on at least one of the one or more storage devices for execution by at least one of the one or more processors via at least one of the one or more memories, to define a bridge port further comprises program instructions, stored on at least one of the one or more storage devices, to define a virtual switch.

12. The data processing system of claim 10, wherein the virtual switch is an intra-ensemble data network virtual switch.

13. The data processing system of claim 10, further comprising:
   program instructions, stored on at least one of the one or more storage devices for execution by at least one of the one or more processors via at least one of the one or more memories, to define on a virtual server basis, a network interface for the corresponding virtual network.

14. The data processing system of claim 10, wherein at least the cluster of virtual servers are in a common virtual network and in a common CPC.

15. The data processing system of claim 10, wherein program instructions, stored on at least one of the one or more storage devices for execution by at least one of the one or more processors via at least one of the one or more memories, to define at least one virtual network further comprises:
   program instructions, stored on at least one of the one or more storage devices for execution by at least one of the one or more processors via at least one of the one or more memories, to assign no more than one internet protocol address to each virtual server of the cluster of virtual servers in the at least one virtual network.

16. The computer program product of claim 15, wherein program instructions, stored on at least one of the one or more storage devices for execution by at least one of the one or more processors via at least one of the one or more memories, to define the at least one virtual network further comprises:
   program instructions, stored on at least one of the one or more storage devices for execution by at least one of the one or more processors via at least one of the one or more memories, to activate a HiperSockets interface for each virtual server.

17. The computer program product of claim 15, wherein the one internal protocol address is an IPv4 and an IPv6 address.

\* \* \* \* \*